Oct. 1, 1963  L. B. ROSSEAU  3,105,865
ELECTRIC SALT BATH FURNACE AND ELECTRODE
Filed May 27, 1960  6 Sheets-Sheet 1

INVENTOR
LEON B. ROSSEAU
BY
Synnestvedt & Lechner
ATTORNEYS

Fig. 4.

Oct. 1, 1963    L. B. ROSSEAU    3,105,865
ELECTRIC SALT BATH FURNACE AND ELECTRODE
Filed May 27, 1960    6 Sheets-Sheet 3

INVENTOR
LEON B. ROSSEAU
BY
*Symestvedt + Lechner*
ATTORNEYS

Oct. 1, 1963

L. B. ROSSEAU

3,105,865

ELECTRIC SALT BATH FURNACE AND ELECTRODE

Filed May 27, 1960

INVENTOR
LEON B. ROSSEAU
BY
*Symmestvedt + Lechner*
ATTORNEYS

Oct. 1, 1963 L. B. ROSSEAU 3,105,865
ELECTRIC SALT BATH FURNACE AND ELECTRODE
Filed May 27, 1960 6 Sheets-Sheet 5

INVENTOR
LEON B. ROSSEAU
BY
Synnestvedt & Lechner
ATTORNEYS

Oct. 1, 1963  L. B. ROSSEAU  3,105,865
ELECTRIC SALT BATH FURNACE AND ELECTRODE
Filed May 27, 1960  6 Sheets-Sheet 6

INVENTOR
LEON B. ROSSEAU
BY
Symmestvedt + Lechner
ATTORNEYS

United States Patent Office 3,105,865
Patented Oct. 1, 1963

3,105,865
ELECTRIC SALT BATH FURNACE AND ELECTRODE
Leon B. Rosseau, Penn Valley, Narberth, Pa., assignor to Ajax Electric Company, Philadelphia, Pa., a corporation of Pennsylvania
Filed May 27, 1960, Ser. No. 32,329
4 Claims. (Cl. 13—23)

This invention relates to electric salt bath furnaces and, more particularly, to a special electrode and furnace arrangement which, while maximizing ease of removal and replacement of electrodes, at the same time has the advantage of simplicity in manufacture, even with respect to extraordinarily large electrodes capable of withstanding unusually high kilowatt loading.

Electric salt bath furnaces of the general kind here involved are commonly used for numerous heat treating purposes. They employ a pot, preferably built up of blocks or tiles of ceramic material, enclosed within a suitable structural and insulated housing and associated with a plurality of metal electrodes connected to a source of electric power. The electrodes are spaced apart in the salt so that electric current flows through the salt between electrodes and maintains the salt in molten liquid condition and at the desired temperature.

This invention is an improvement over prior structures, for example, those disclosed in my prior Patent No. 2,826,623, issued March 11, 1958, and my prior copending application Serial No. 577,980, filed April 13, 1956, now Patent No. 2,972,651, which patents are assigned to the assignee of the present application.

As illustrated in my prior patent and application, the electrode is in the form of a hot leg mounted vertically in the pot below the normal level of the salt, a cold leg mounted horizontally above the pot wall, and an intermediate leg disposed at a slant, outwardly and upwardly of the pot, and interconnecting the top of the hot leg and the inner end of the cold leg. The free end of the cold leg is adapted for connection to the bus bars of a source of electric current.

As also shown in my prior patent and application, the problem of electrode corrosion in the vicinity of the molten salt bath surface may be lessened by surrounding the electrode at this point with blocks of ceramic material in surface contact with the electrode. The blocks of ceramic material are formed separately from the pot wall and are assembled with the electrode and pot wall so as to be supported largely by resting on abutment surfaces provided on the electrode.

Electrodes of the type illustrated in my prior patent and application have a hot leg and an intermediate leg each made of a solid metal bar of rectangular cross section, these two legs being secured to each other by the application of weld metal. The cold leg is in the form of three laminations secured in parallel spaced relation to one face of the upper end of the intermediate leg of the electrode, also by means of the application of weld metal.

While the structures shown in my prior patent and application are suitable for many applications, certain difficulties and problems tend to arise and it is to these special problem areas that the present invention is particularly directed. There follows a brief discussion of these problem areas.

In the first place, it is pointed out that there are some practical, although not necessarily theoretical, limitations on the maximum size of the electrode which can conveniently and advantageously be made with the above-mentioned slanting intermediate leg. Electrodes up to about three inches on a side can quite conveniently be manufactured in the form shown in my prior patent and application. However, if it is desired to construct an electrode substantially larger than this, for example four inches on a side, in order that the electrode may carry a substantially larger electrical load, welding problems are encountered in attempting to secure the hot leg to the intermediate leg. One such problem is in the proper relative positioning of the parts and their maintenance in that position during the welding operation, such positioning problems being progressively increased as the weight and bulkiness of the parts being welded increases. In this connection it is mentioned that welding the intermediate leg at an angle to the hot leg even slightly inaccurate leads to difficulties when such electrodes are mounted in furnaces, since the desired tight surface contact with the various ceramic blocks is not readily obtained when the angles of inclination of the intermediate legs vary from electrode to electrode. Even slight variations in the angle of the intermediate leg can necessitate special grinding, or other fabrication steps performed on the ceramic blocks, in order to bring about a satisfactory surface fit against the electrode.

An even more serious problem in attempting to weld solid massive bars of extraordinarily large cross section arises because of the bulk of weld metal which must be applied and because of the relatively large cross sectional area over which the weld metal must be applied with substantial uniformity. Massive welds and large area welds tend to develop problems when electrodes are put into service. Minute cracks sometimes develop in such welds and these cracks interfere with the current flow through the weld metal. Since the cracks normally form in planes transverse the direction of current flow in the electrode, the cracks result in a concentration of current flow which can lead to severe problems of overheating, electrode failure, inadequate bath heating, etc.

The welding problems above mentioned are aggravated by the fact that it is desirable, from a metallurgical point of view, to minimize electrode corrosion by forming the electrodes from steel alloys having special properties. For example, it is desirable to make the electrodes from chromium stainless steel in which the chromium content runs as high as 25 to 30% by weight. Such alloy steels are quite difficult to weld. Indeed, it is commonly thought in the steel industry that such alloys cannot be successfully welded. In any case, it takes an unusually skillful welder and exceptionally exacting quality control procedures to produce large welded electrodes from high alloy steels on a production basis. It sometimes happens that a large number of electrodes must be welded in order to obtain one or two electrodes which pass the quality control inspections and tests and are satisfactory for service in a furnace.

Efforts to lessen the weld problems by lowering the alloy content of the steel used may help, to some degree, but this would be at the sacrifice of metallurgically desirable electrode properties.

Other problems result from the relatively high temperature to which electrodes made according to my prior patent and application are subjected as a result of surrounding them, at the region where they emerge from the salt bath, with blocks of ceramic material. While the rate of electrode corrosion depends on a large number of variables, it is particularly affected by the quantity of salt or salt vapor present, the quantity of air or oxygen present and the temperature of the metal exposed to the salt and air. The higher the temperature, the more rapid the corrosion. Encasing an electrode in blocks of ceramic material at the point of emergence from the salt bath significantly reduces the rate of corrosion by physically substantially excluding air from contact with the electrode. However, another result of the presence of the ceramic blocks is the minimization of heat dissipation from the electrode to the surrounding atmosphere by radiation and convection. As a consequence, electrodes surrounded with ceramic blocks tend to operate at somewhat higher temperatures, at least in the portions of the electrodes immediately above the bath surface.

Attempts have been made heretofore to cool various portions of an electrode by providing the electrode with interior coolant passages and flowing some coolant medium, conveniently water, through these passages during electrode operation. In such cooling procedures, the attempt is not to reduce the temperature of the electrode in the working region or hot leg region deep in the salt, nor to cool the salt bath itself, but rather to cool the portion of the electrode protruding out of the salt, especially that portion which is just above the level of the salt and which is exposed to the maximum quantum of salt vapor.

In electrodes of the kind illustrated in my prior patent and application, difficulties may be encountered in attempting to provide the intermediate legs of the electrodes with interior coolant passages. It is mechanically difficult to drill holes in slanting metal bars. Furthermore, the slanting portion of the electrode is more or less embedded in the apparatus in a manner which makes it quite inconvenient to provide for the attachment of coolant conduits. In an effort to make the coolant connectors accessible, they have been provided in positions where they protrude upwardly above all of the surrounding portions of the electrode. While this facilitates the connection of coolant tubes, it also results in the exposure of the connectors to severe hazards of accidental bumping and dislocation. In this connection, it must be kept in mind that the electrodes are relatively heavy objects, ordinarily handled by means of overhead hoists, and that relatively delicate protuberances from the electrodes, such as tubing connectors, are particularly vulnerable to accidental brushing contact with other parts of the equipment during assembly and disassembly thereof, and during shipping. In any case, practical experience has shown that protruding coolant connectors of the kind mentioned are a constant source of trouble because they are so frequently banged out of alignment, or so that threads in the electrode are stripped, or so that the coolant tubes do not interfit therewith, etc.

But of even more importance, after the electrodes are in place and the furnace is in operation, accidental bumping of the coolant connectors, for example by a swinging work load or work basket suspended from an overhead crane, could result in a break or leak in the water circuit and the development of an extremely hazardous condition. Water might thereby squirt into the salt bath and cause a virtual explosion which would spray high temperature salt in all directions.

Still further, the structures shown in my prior patent and application tend to encounter problems resulting from using blocks surrounding the electrode which are supported in the furnace by resting on the electrodes themselves. Slight electrode misalignment or wear can result in an uneven support of various of the blocks with the result that they do not always remain firmly in place during operation of the furnace. Furthermore, replacement of the electrodes for which a given furnace was designed with electrodes of a slightly different size can result in a lack of accurate fit of the blocks designed to rest upon the electrodes. In addition, the gradual formation of scale in the crack between a slanting electrode and a slanting block surface results in the application of a force to the block in direction tending to topple it over into the salt bath.

With the foregoing problems in mind, attention is directed to the invention herein.

The invention provides for a simplified electrode construction having the massive portion of the electrode (as distinguished from non-massive cold leg laminations) in the form of a single unitary straight bar, rather than in the form of two or more such massive bars which must be welded together. In addition to minimizing manufacturing expense by minimizing welding operations and minimizing the number of massive pieces of metal which must be prepared to size, the single unitary solid bar type electrode of the invention eliminates the necessity for effecting massive and large area welds. It thus makes it feasible to use the metallurgically most desirable alloys for the massive portions of the electrode.

In addition, the invention provides for a minimization of corrosion not only by substantially excluding air from contact with the electrode in the region of the bath surface, but also by positively reducing the temperature of the electrode in that region by dissipating excess heat therefrom by the use of a liquid coolant. At the same time the invention provides a positive, simple and effective guard means for preventing accidental damage to the coolant tubes and connections. The result of the minimization of corrosion is a significant reduction in the rate of scale formation.

Still further, the invention maximizes the ease of removal and replacement of electrodes and the loose blocks associated therewith by providing for the support of the loose blocks on the pot wall itself rather than directly on the electrodes. The reduction of scale, as above mentioned, minimizes the tendency for developing scale to topple the ceramic blocks. Further, the structural arrangement of the blocks and electrodes of the invention provides for translational movement of the blocks in the event of scale formation, rather than toppling movement of the blocks.

Stated in sum, the invention provides structure particularly easy and inexpensive to manufacture on a production basis, and yet which attains the maximum in desirable metallurgical and electrical properties, and minimizes maintenance trouble and expense by prolonging electrode life and by facilitating electrode removal and replacement.

The primary object of the invention is the provision of an electric salt bath furnace and/or electrode of simplified design which maximizes ease of manufacture without sacrificing metallurgical desiderata for the sake of overcoming fabrication difficulties.

A further object of the invention is the provision of an electrode having a massive member in the form of a simple straight bar, and which involves welding only with respect to much less massive members and over a cross section substantially less than the cross section of the massive portion of the electrode.

Still further the invention has as an object the provision of an electrode having interior coolant passages and associated connector fittings which fittings are readily accessible for the attachment of coolant conduits and amply protected from accidental dislocation.

Yet another object of the invention is the provision of a special furnace construction adapted to accommodate an electrode according to the invention without resting any portions of the ceramic material of the furnace directly on the electrode.

It is a further general object of the invention to make possible the construction of extraordinarily large electrodes capable of withstanding unusually high electrical loading, which electrodes are, none the less, readily removable from the furnace with which they are associated without necessitating the shutdown or dismantling of the furnace.

Further objects and advantages of the invention will be seen from the following description, together with the accompanying drawings in which.

Attention is first directed to the embodiment of the invention shown in FIGS. 1 to 8. The upwardly open pot 25 is built up of a plurality of ceramic blocks or tiles 26 and is surrounded by the insulation 27, the whole assembly being held in place by structural members 28, 29 and 30. Cover 31 is conveniently suspended from bar 32 on which are mounted rollers 33, 33 cooperating with tracks 34, 34 mounted on A frame members 35, 35 secured to the structural members 29. By this means the cover 31 can conveniently be moved between a position overlying the furnace and a position to one side thereof by travel of the rollers 33 along the tracks 34.

Figure 4:
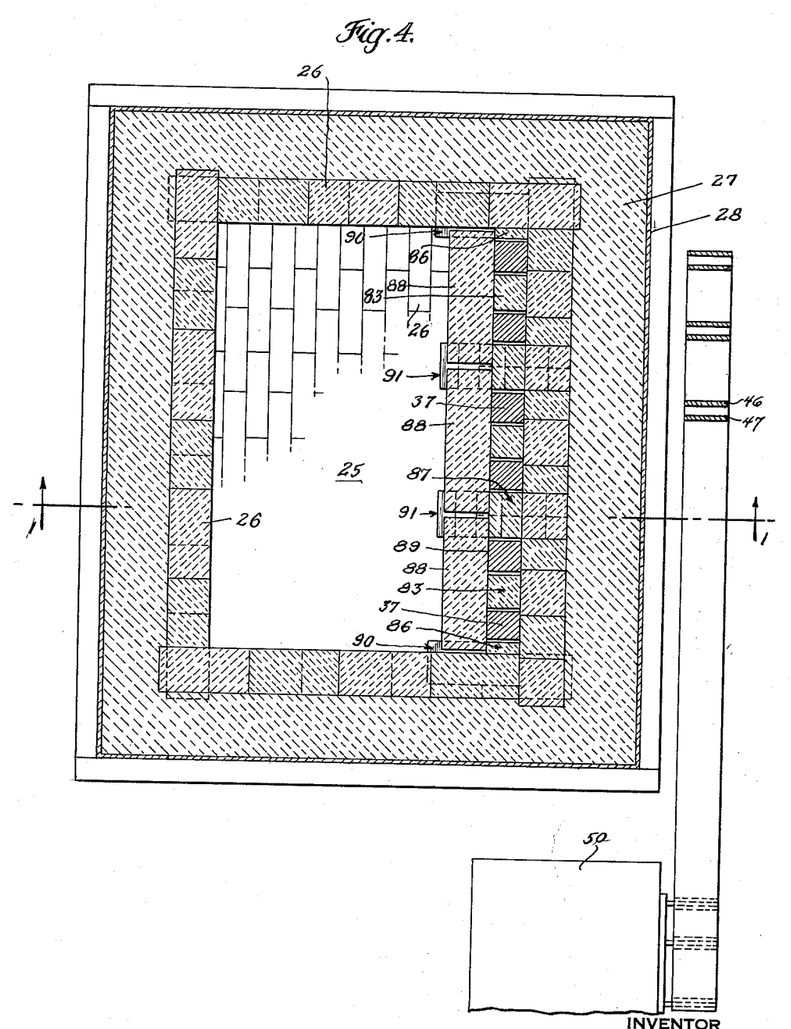
FIG. 4 is a plan section taken on the line 4, 4 of FIG. 1.
Figure 5:
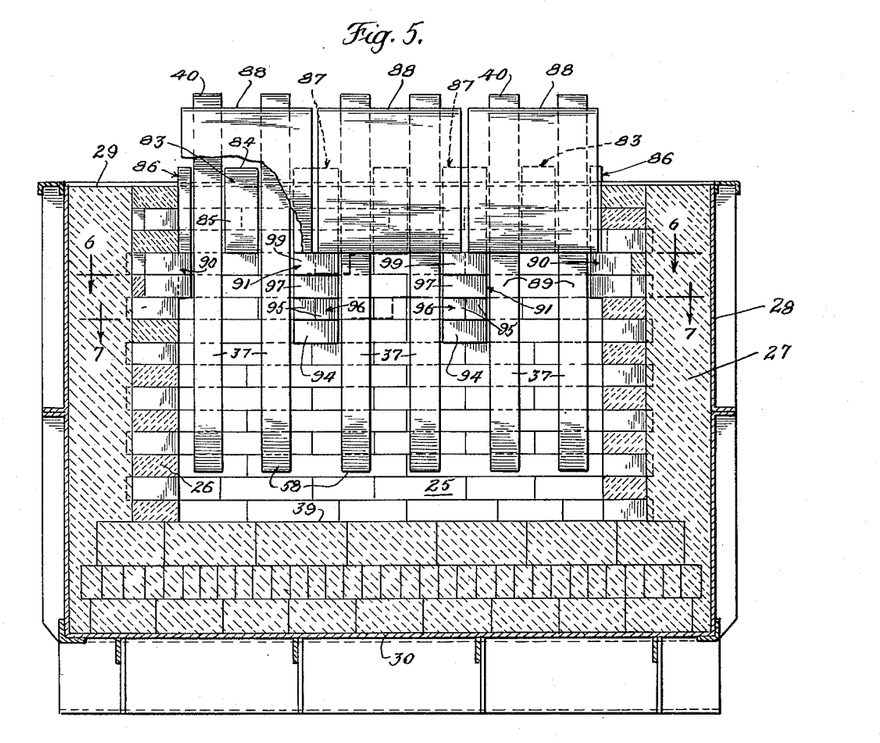
FIG. 5 is a vertical sectional view taken on the line 5, 5 of FIG. 1.

The electrode 36 of the invention comprises a unitary solid metal bar 37 of rectangular and uniform cross section, this bar extending in a straight run from the working region well below the salt level 38, upwardly and out of the salt bath and to a level above the top of the pot wall. The lower end 53 of the bar 37 is disposed a short distance above the floor 39 of the pot and the top 40 of the bar 37 extends well above the upper edge 41 of the pot wall. A plurality of cold leg laminations 42, 43 and 44 are secured to the bar in parallel, side-by-side spaced relation. The cold leg laminations are preferably secured to the rear face 45 of the bar in a position adjacent to but spaced from the upper end 40, for reasons which will appear below. The cold leg laminations are associated with bus bar laminations 46 and 47, the assembly of bus bar and cold leg laminations being securely fastened together by means of the bolts 48 and the nuts 49. As seen in FIG. 4, the bus bar laminations 46 and 47 extend and are secured to a transformer 50 associated with a suitable source of electric power.

The electrodes are secured in position in the furnace by means of the straps 51, spaced from the cold legs by insulators 52, the straps, insulators and cold leg laminations being firmly held together by means of the bolts 53 and nuts 54 which cooperate with suitable fastening elements 55 secured to the structural members 29.

The cold leg laminations 42, 43 and 44 are secured to the bar 37 by means of welds such as those shown at 60. It is here emphasized that the welds involved in securing the cold leg laminations are relatively small welds, being long and thin in shape and of insubstantial total bulk and area. This type of weld can successfully be applied even to high alloy steels of the kind which are metallurgically desirable for salt bath electrodes.

Figure 1:
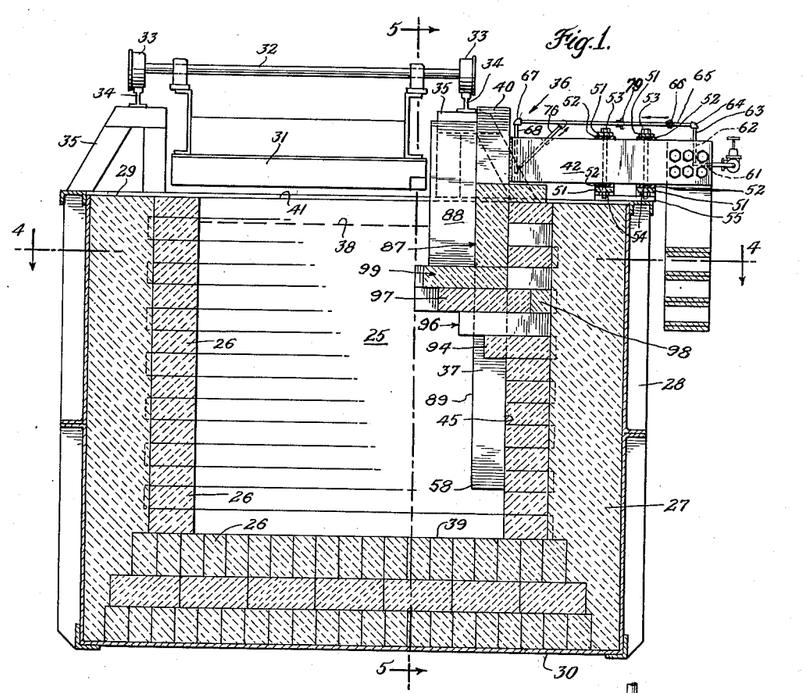
FIGURE 1 is a vertical sectional view of one embodiment of the invention taken on the line 1, 1 of FIG. 4.
Figure 2:
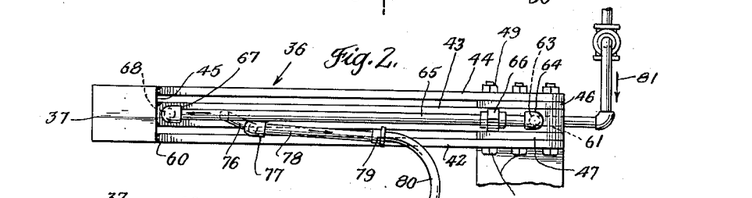
FIG. 2 is a fragmentary plan view, on an enlarged scale as compared to FIG. 1, of the electrode and coolant circuit arrangement shown in FIG. 1.
Figure 8:
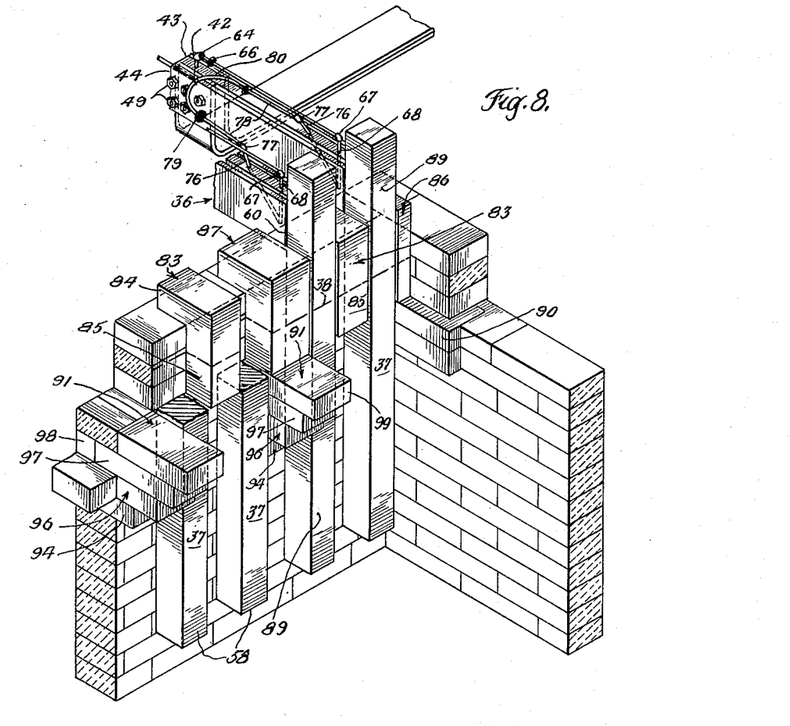
FIG. 8 is an isometric view of a portion of the furnace shown in FIG. 1, this view looking down toward an inside corner of the furnace.

Attention is now turned to the special arrangement of the cooling circuit as best seen in FIGS. 1, 2 and 8. My prior patent above mentioned discloses the use of interior coolant passages in the cold leg central lamination in the region of the contact between the bus bars and cold legs. This type of coolant passage is included in the present invention at 61 and 62 and is particularly well located to carry away heat generated by the passage of current through the interconnection between the bus bar and cold leg laminations and also to minimize the conduction of heat along the bus bar and into the transformer or other electrical apparatus.

The invention herein provides for an additional coolant circuit adjacent the intersection of the cold leg laminations and the main leg or hot leg 37 of the electrode, this coolant circuit being connected in series with the coolant passages 61 and 62 above mentioned.

For this purpose there is provided an upstanding short section of pipe 63, a right angle elbow 64, a horizontal run of pipe 65, including a union 66, a second right angle elbow 67 and a short upright pipe section 68 which is threaded on the end (see FIG. 3) at 69 and screwed into corresponding threads 70 in the drilled passage 71 extending downwardly into the central cold leg lamination 43. The passage 71 intersects another passage 72 which can conveniently be drilled after burning away the small portion of metal as indicated at 73 to provide a flat surface 74 at right angles to the direction of the hole 72. The hole 72 is also tapped as at 75 and a short section of pipe 76 is threaded and screwed into the hole 72. A 45° elbow 77 is provided on the free end of the pipe 76 and a short horizontal run of pipe 78 connected thereto terminates in a hose connector 79. A section of rubber hose 80 interconnects the coolant circuits of adjacent electrodes while providing electrical insulation therebetween.

As seen in FIG. 2, water inflows, as indicated by the arrow 81, first through the coolant passages adjacent the bus bar end of the cold leg and then through the coolant passages adjacent the hot leg. Thereafter the coolant water flows through the rubber hose 80 and a corresponding coolant circuit in the adjacent electrode, the water in the second electrode flowing in direction opposite to that taken during flow through the first electrode. The water exits as indicated by the arrow 82. It is sometimes desirable to provide an entirely separate cooling circuit for each electrode. In such case the rubber hose 80, which connects the coolant circuits of adjacent electrodes in series, would be omitted.

The special cooling action provided by the flow of water through the passages 71 and 72 provides for the rapid and effective dissipation of heat from the main body of the electrode. Since the bar 37 is made of metal and is therefore a reasonably good conductor of heat, heat will be conducted up the electrode from the region of the level of the salt bath and will be conducted out along the cold leg laminations and will then be picked up and carried away by the coolant.

Special tile means supported by the pot wall are provided in intimate surface contact with all of the exposed surfaces of the electrode in the region of the normal level of the salt bath. This structure is best seen in FIGS. 1, 4, 5 and 8. As there seen, the rear surface 45 of the electrodes, that is, the face of the electrodes bearing the cold leg laminations, is conveniently disposed tight against the pot wall. Between the electrodes of a pair there is provided an L-shaped ceramic block or tile 83, the block 83 being mounted in the furnace in inverted position with one leg 84 of the L resting on the top of the pot wall and the other leg 85 of the L projecting downwardly into the pot and extending to a level below the normal level 38 of the salt.

On either side of the pair of electrodes additional L-shaped blocks are provided and are similarly oriented with respect to the pot. In the form of the invention shown in FIGS. 1 to 8, a slender L-shaped block 86 is provided to fit between the outboard electrode and the pot wall and a fat L-shaped block 87 is provided to fit between adjacent pairs of electrodes.

The three L-shaped blocks 83, 86 and 87 together provide ceramic surfaces relatively tight against the side surfaces of a pair of electrodes. A face tile 88 is provided (see FIGS. 1, 4 and 5) which is in intimate surface contact with the front faces 89 of both electrodes of a pair.

In the form of the invention illustrated in FIGS. 1 to 8, the face tiles are supported by means of piers projecting from the pot wall below the level of the salt. At opposite sides of the furnace, side piers 90 are provided, preferably formed of the same ceramic blocks as the pot wall, and between pairs of electrodes the projecting piers 91 are provided, these being built up step by step through several courses of tile.

The L-shaped tiles 83, 86, and 87, while they rest primarily on the top of the pot wall by means of the leg of the L extended thereover, rest in part upon the piers and against the face tile 88. However, all of the blocks surounding the electrodes which are loose from the furnace wall are supported entirely by the pot wall and do not depend on the electrodes for support.

Figure 3:
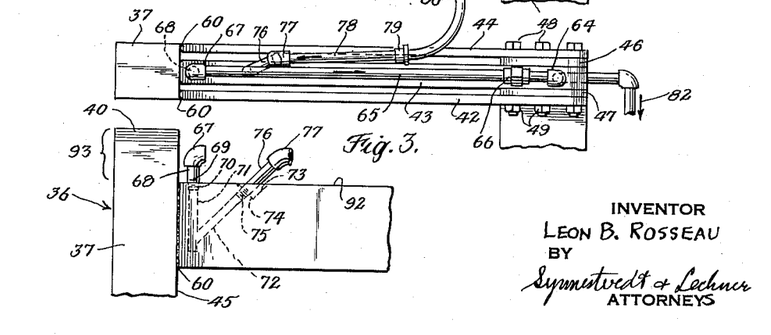
FIG. 3 is a fragmentary side view of a portion of one of the electrodes shown in FIG. 2, this view showing the coolant connectors positioned as they would be for shipping and handling of the electrode and before the associated coolant conduit is assembled.

Attention is now directed to an important aspect of the invention. As seen in FIGS. 1, 2, 3 and 8, the top end 40 of the main bar 37 of the electrode protrudes above the upper edge 92 of the cold leg laminations a substantial distance as indicated at 93 in FIG. 3. The protruding portion 93 of the bar 37, in effect, comprises a guard portion of the bar and the connectors 67, 68 and 76, 77 provided for interconnection with the coolant conduit are disposed on the lee or sheltered side of the protruding portion 93 of the electrode. In other words, the top 40 of the electrode main bar lies above the tops of the coolant connectors. By this arrangement of the tube connectors with respect to the guard portion of the bar and with respect to the cold leg laminations, the risk that the tube connectors will be jarred or bent or dislocated during handling or shipping of the electrode and after the electrode is placed in service is virtually eliminated. By way of comparison, consider the increased vulnerability of the connectors 67 and 77, as seen in FIG. 3, if the bar 37 of the electrode terminated at the level of the upper edge 92 of the cold leg laminations.

The protruding portion 93 is just as bulky and rugged as the main electrode bar and is therefore just as strong as a guard member as the electrode itself. In this connection it is mentioned that the pipes 68 and 76 and the elbows 67 and 77 are arranged so as to make possible the convenient assembly of the horizontal runs of pipe 65 and 78 while maintaining the exposed piping tucked as tightly as possible against the cold leg laminations. In the form of the invention illustrated, the pipe 76 is bent slightly so as to clear the pipe 65 and thus make possible the disposition of both the run 65 and the run 78 in substantially the same horizontal plane.

Figure 6:
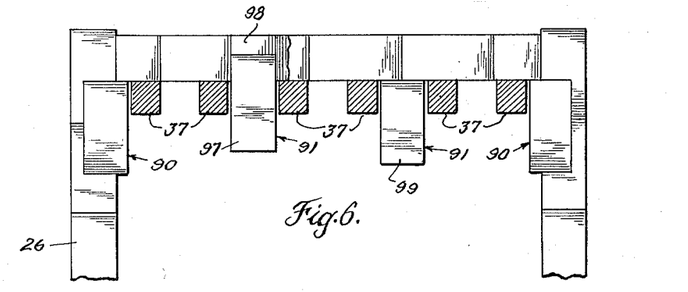
FIG. 6 is a fragmentary plan section taken along two adjacent courses of tiles as indicated by the line 6, 6 of FIG. 5.
Figure 7:
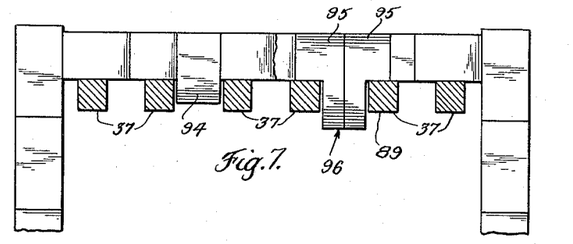
FIG. 7 is a plan section similar to FIG. 6 but taken along two other adjacent courses of tiles as indicated by the line 7, 7 of FIG. 5.

The four courses of tile involved in the construction of the piers 91 are illustrated in plan in FIGS. 6 and 7. Beginning with the illustration of the lowermost course as seen in FIG. 7, blocks 94 protrude inwardly from the pot wall a short distance, somewhat less than ½ a block length. In the right-hand portion of FIG. 7 the next course of tiles upwardly is shown and it is there seen that two separately shaped blocks 95 are provided which together form a projection 96 extending into the pot farther than blocks 94.

The third course from the bottom of the pier is shown in the left-hand portion of FIG. 6. The blocks 97 extend inwardly into the pot about two-thirds of their length and a filler block 98 is provided in the pot wall behind the blocks 97. The top course of tiles in the piers 91 is shown, in the right-hand portion of FIG. 6, at 99 and this block, in its entire length, extends inside of the pot wall. As shown in FIG. 8, the L-shaped block 87 rests on the surface of block 99 adjacent the pot wall while, as seen in FIG. 1, the face tile 88 rests on the portion of the block 99 lying toward the center of the pot.

With the electrode construction and separate tile means discussed above in connection with FIGS. 1 to 8, a number of significant advantages are attained over and above prior structures. In the first place, it is easier and less expensive to provide the massive portions of the electrode in the form of a single straight unitary bar rather than in the form of a number of pieces welded together. In the second place, the avoidance of welds of substantial area and massive character is made possible by the provision of a single straight run of the massive portion of the electrode.

Additionally, while protection against corrosion is provided by the special removable tiles which make possible the ready and quick removal and replacement of the electrode without any disassembly of the pot wall, the added advantage is present that the blocks all rest on the pot wall, rather than on the electrode itself.

Still further, the temperature of the electrode is kept at a desirably low level just above the surface of the salt by the provision of interior coolant passages equipped with connectors which are protected against accidental dislocation.

Figures 16, 17, 20:
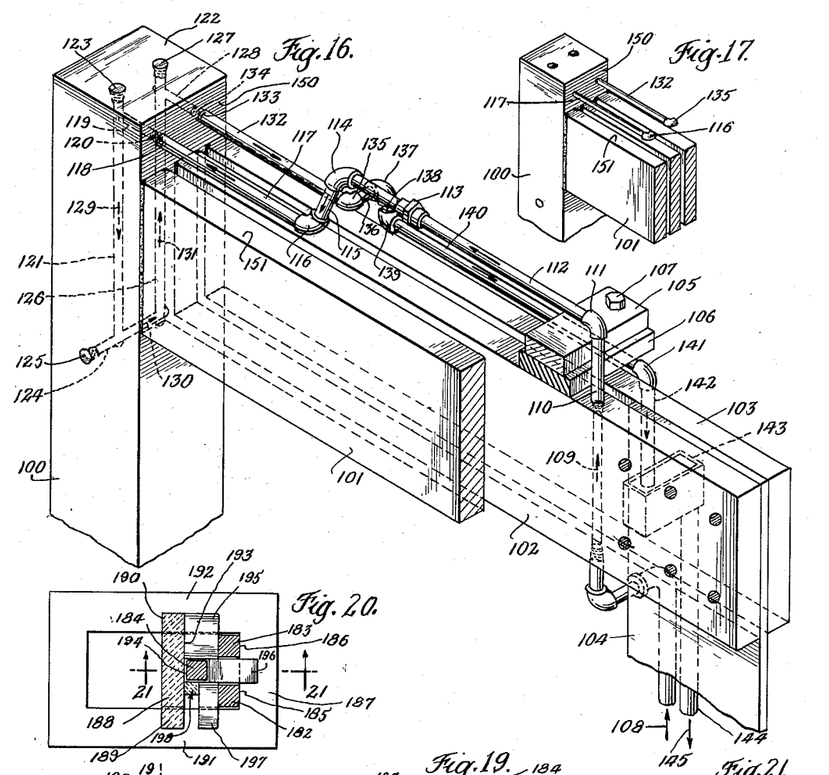
FIG. 16 is an isometric view, on an enlarged scale, of portions of another electrode embodiment of the invention.
FIG. 17 is a fragmentary isometric view, on a reduced scale as compared with FIG. 16, showing parts of the electrode and the coolant connectors in position as they would be for shipping and handling of the electrodes.
FIG. 20 is a plan section taken along the line 20, 20 of FIG. 18.

Attention is now turned to the embodiment of the invention shown in FIGS. 16 and 17.

As there seen, the vertical main bar 100 of the electrode is substantially similar to main bar 37 as shown in the previous embodiment. The cold leg laminations 101, 102, 103 are also similar in construction and arrangement to the cold leg laminations 32, 33 and 34 discussed above, and the cold leg laminations cooperate with bus bars, one of which is shown at 104, in the manner above discussed. The strap 105, insulator 106, and securing means 107 hold the electrode in position in the furnace.

The coolant circuit provided for the electrode of FIGS. 16 and 17 is different from that shown in FIGS. 1 to 8. Coolant enters the system as indicated by arrow 108 and flows upwardly as indicated by the arrow 109 through the central lamination 102 of the cold leg in the vicinity of the bus bar 104.

Pipe 110 extends upwardly out of the cold leg and is connected by right angle elbow 111 with a horizontal run of pipe 112 which spans the electrode supporting means 105, 106 and 107. The pipe 112 includes a union 113 and is connected by an elbow 114, a short run of pipe 115 and elbow 116 with a horizontal run of pipe 117 threaded at the end, as indicated at 118, and screwed into hole 119 tapped as indicated at 120.

The passage 119 intersects the passage 121, which is conveniently formed by drilling downwardly from the top surface 122 of the electrode bar 100. After the hole 121 is drilled to the desired depth, a plug 123 may be placed in the upper end of the hole and secured in position by the application of weld metal. The passage 121 intersects the passage 124 drilled horizontally through a side of the bar 100, the open end of the passage 124 also being conveniently sealed by means of a plug 125.

The horizontal passage 124 intersects a second vertical passage 126 parallel and similar to passage 121 and formed in the same way with a top plug 127. Horizontal passage 128 is arranged in a manner similar to horizontal passage 120 and intersects vertical passage 126.

The cooling water flowing in as indicated by the arrow 108 flows upwardly through pipe 110 and into the passage 120 in the electrode main bar via pipes 112 and 117 and the associated fittings. The coolant then flows downwardly as indicated by arrow 129 through the passage 121, horizontally as indicated by arrow 130 through passage 124, upwardly as indicated by arrow 131 through passage 126, and out of the electrode main bar via passage 128.

The water then flows through pipe 132, which is threaded as at 133 and screwed into cooperating threads 134 in the entrance of pasasge 128. Pipe 132 is connected by elbow 135, short pipe section 136, elbow 137, pipe section 138, elbow 139 and horizontal run of pipe 140, elbow 141 and vertical exit pipe 142, with a sight drain box 143 from which the water exits through pipe 144, as indicated by the arrow 145.

It is here mentioned that observation of the water passing through the sight drain box 143 provides a ready check on the operation of the coolant system. The flow-through of the coolant medium, conveniently water, should be sufficiently rapid to carry off the desired quantum of heat with little rise in water temperature. Therefore, observation of extremely hot water or steam exiting into the sight drain box 143 would indicate a malfunction and warn the operator to find the source and correct the matter. A similar warning would be given if the outflow of coolant stopped altogether. In either case, it is important to correct the operation of the coolant system immediately because the injection even of a small quantity of water through a leak, crack, etc. into the salt bath is an inherently dangerous occurrence which might lead, because of the drastic expansion in volume taking place upon vaporization, in a splashing around of the hot salt. Because of the hazard involved if coolant water should leak into the salt bath, it is desirable to flow the coolant only in the portion of the bar extending above the surface of the salt.

The embodiment of the invention shown in FIGS. 16 and 17 is particularly well suited for electrodes of exceptionally massive proportions. For example, an electrode of square section four inches, or even more, on a side can advantageously be constructed according to FIGS. 16 and 17. In smaller sizes there is, as a practical matter, some risk of spoiling the electrode bar during the drilling of the two deep coolant passage holes, because of the drift sometimes encountered in drilling deep holes. However, when extra large electrodes are made, such drift is quite unlikely to result in the bottom of the hole being dangerously near to the surface of the electrode.

FIG. 17 illustrates the parts of the electrode which would be assembled for shipment or handling of the electrode, these parts including the protruding pipes 117, 132 and the associated elbows 116 and 135. In this respect FIG. 17 is similar to FIG. 3. As clearly seen in FIG. 17, the top portion 150 of the electrode main bar extends above the upper edge 151 of the cold leg laminations and provides a guard portion similar to the guard portion discussed above in connection with the embodiment of FIGS. 1 to 8.

Both embodiments provide for the mounting of coolant connectors in positions such that they are guarded against accidental bumping and dislocation by means of the projecting portion of the electrode main bar and the interrelation thereof with the positioning of the cold leg laminations and the coolant connectors.

Attention is now turned to the embodiments of the invention shown in FIGS. 9 to 15 and 18 to 21. In connection with these embodiments, it is pointed out that either the type of electrode shown in FIGS. 1 to 8 or the type of electrode shown in FIGS. 16 and 17 can be used with the pot modifications shown in FIGS. 9 to 15 and 18 to 21.

Figures 9, 10, 11:
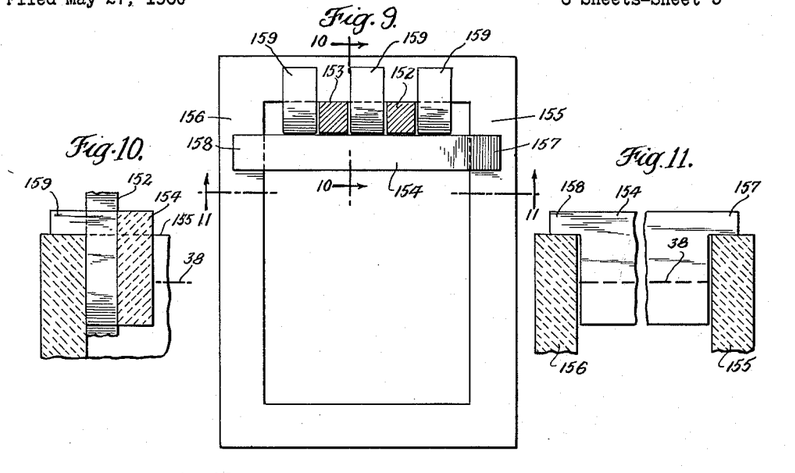
FIG. 9 is a somewhat diagrammatic plan section of another embodiment of the invention involving a furnace with one pair of electrodes.
FIG. 10 is a fragmentary sectional elevation taken along the line 10, 10 of FIG. 9.
FIG. 11 is a fragmentary sectional elevation taken along the line 11, 11 of FIG. 9.

FIGS. 9 to 11 illustrate a relatively small furnace involving two electrodes 152 and 153. A single face tile 154 is provided which spans the entire distance between the sides 155 and 156 of the pot. As seen in FIG. 11, face tile 154 includes projections 157 and 158 for cooperation wtih pot sides 155 and 156, respectively. In effect, the face tile is in the shape of the letter T, with the arms of the T resting on the sides of the pot wall and the foot of the T extending downwardly into the pot in surface contact with the front faces of the electrodes 152 and 153. Three L-shaped blocks 159 are provided, one on each side of the pair of electrodes and one between the two electrodes of the pair.

Figure 12:
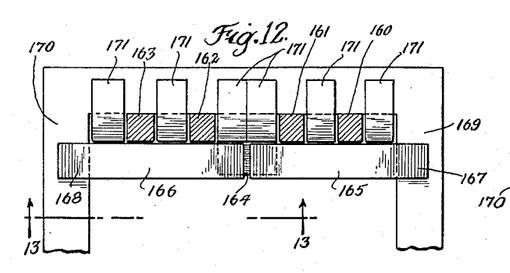
FIG. 12 is a somewhat diagrammatic plan section similar to FIG. 9 but showing another embodiment of the invention involving a furnace having two pairs of electrodes and utilizing face tiles each of which is supported at one end by the top of the pot wall and at the other end by a central pier.
Figure 13:
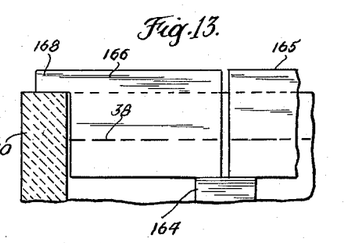
FIG. 13 is a fragmentary sectional elevation taken along the line 13, 13 of FIG. 12.

In the embodiment shown in FIGS. 12 and 13, a furnace with two pairs of electrodes is shown, the electrodes being designated 160, 161, 162 and 163. The pot wall includes a central pier 164. The face tiles 165 and 166 are provided with extensions 167 and 168, respectively, which rest on opposite side walls 169 and 170 of the pot. In the center the face tiles 155 and 156 rest on the pier 164. The plurality of L-shaped tiles 171 provide for surface contact with the sides of all four electrodes.

Figure 14:
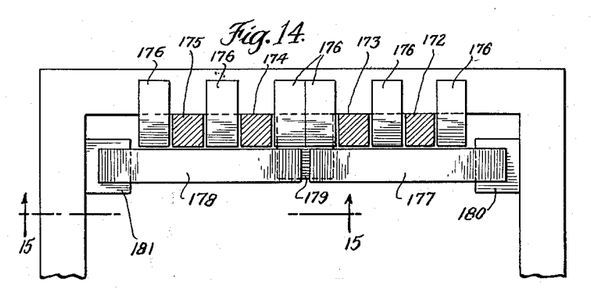
FIG. 14 is a somewhat diagrammatic plan section generally similar to FIG. 12 but involving face tiles each of which is supported by piers at both ends thereof.
Figure 15:
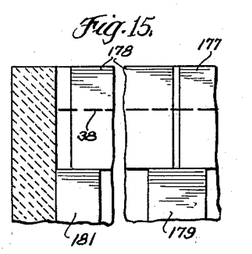
FIG. 15 is a fragmentary sectional elevation taken generally along the line 15, 15 of FIG. 14.

The embodiment shown in FIGS. 14 and 15 is generally similar to that shown in FIGS. 12 and 13 except that the furnace is slightly larger and the face tiles rest entirely on piers. As seen in FIGS. 14 and 15, the four electrodes 172, 173, 174 and 175 are disposed in a manner similar to electrodes 160 to 163 of FIG. 12. L blocks 176 are similar to the L blocks 171 in FIG. 12. Face tiles 177 and 178 rest at the center on pier 179 and at the outboard sides on piers 180 and 181.

The embodiment of the invention shown in FIGS. 18 to 21 involves the use of three electrodes 182, 183 and 184. Electrodes 182 and 183 are mounted in the furnace with their rear faces 185 and 186, respectively, against the pot wall 187. Electrodes 182 and 183 are spaced apart and the third electrode 184 is mounted in the furnace in front of and generally between electrodes 182 and 183.

Figure 18:
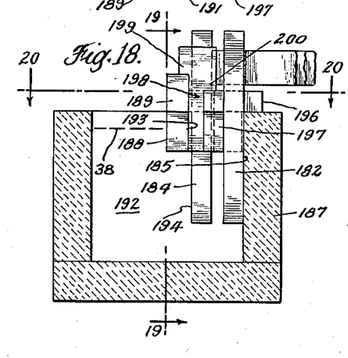
FIG. 18 is a vertical sectional side view, on a reduced scale, of another embodiment of the invention involving the use of three electrodes.
Figure 19:
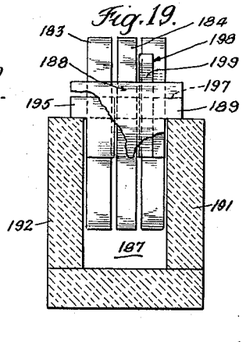
FIG. 19 is a vertical sectional front view taken along the line 19, 19 of FIG. 18.
Figure 21:
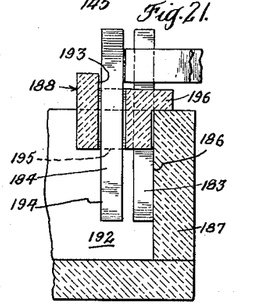
FIG. 21 is a fragmentary vertical sectional view, taken generally along the line 21, 21 of FIG. 20.

A face tile 188, of generally T shape and having projecting support ears 189 and 190 spans the furnace with the support ears resting on the side walls 191 and 192 and with the surface 193 of the face tile in surface contact with the front face 194 of the innermost electrode 184. Specially shaped L blocks 195, 196 and 197 together with filler block 198 serve to surround the remaining exposed surfaces of the three electrodes with ceramic material in the region of the normal level of the salt bath. As seen in FIG. 18, filler block 198 includes support ears 199 and 200 which rest on face tile 188 and L tile 197, respectively.

I claim:

1. An electric salt bath furnace comprising, an upwardly open pot built up from a plurality of tiles, a pair of removable electrodes each of which is a unitary solid metal bar of rectangular and uniform cross section with three cold leg laminations secured in parallel, side-by-side, spaced relation to a face of the bar adjacent to but spaced from one end thereof so that a guard portion of the bar projects beyond the cold leg laminations, the electrodes being assembled with the furnace with the free end of the bar extending downwardly into the pot and with the cold leg laminations extending outwardly over the pot wall, the face of the electrode bearing the cold leg laminations being in surface contact with the pot wall at least in the region of the normal level of the salt bath, and separately formed ceramic blocks closely surrounding and in surface contact with the entire bar in the region of the normal level of the salt bath, except for said face of the bar which is in surface contact with the pot wall, all of said blocks being entirely supported by the pot wall, and being readily removable without disturbing the tiles of the pot wall to facilitate removal and replacement of the electrodes, the central cold leg lamination having interior coolant passage means and coolant tube connectors in communication with said passage means and protruding from the electrode in position such as to be guarded against accidental bumping and dislocation by means of the projecting guard portion of the bar.

2. In an electric salt bath furnace of the kind having an upwardly open pot, a pair of removable electrodes projecting over the wall of said pot and downwardly into the pot, and tile means closely surrounding each electrode in the region of the normal level of the salt bath, tile support means projecting horizontally inwardly from the pot wall at opposite sides of the pair of electrodes, the upper surface of said support means being at a level just below the normal level of the salt bath, a face tile adapted to span and rest on said support means in surface contact with the inner surface of each of the electrodes in the region of the normal level of the salt bath, block means fitting between and block means fitting on both sides of the pair of electrodes and resting against the pot wall and against the face tile, said block means including surfaces in contact with the sides of each electrode in the region of the normal level of the salt bath, the face tile and block means being readily removable without disturbing the pot wall to facilitate removal and replacement of the electrodes, and each electrode comprising a unitary solid metal bar of rectangular and uniform cross section which bar extends in a straight run from a working region well below the normal level of the salt bath upwardly and out of the salt bath and to a level above the top edge of the pot wall, and a plurality of cold leg laminations secured in parallel, side-by-side, spaced relation to the rear face of the bar adjacent to but spaced from the upper end thereof so that a guard portion of the bar projects above the upper side of the cold leg laminations, each electrode having interior coolant passage means, inlet and outlet apertures in communication with said passage means, and inlet and outlet fittings arranged to protrude from the apertures in such position as to be protected by the guard portion of the bar against accidental dislocation.

3. In an electric salt bath furnace of the kind having an upwardly open pot, a plurality of pairs of removable electrodes projecting over the wall of said pot and downwardly into the pot and tile means closely surrounding each electrode in the region of the normal level of the salt bath, tile support means projecting horizontally inwardly from the pot wall on both sides of each pair of electrodes, the upper surfaces of the support means all being at a level just below the normal level of the salt bath, a face tile for each pair of electrodes adapted to span and rest on the support means on each side of that pair of electrodes, the face tiles each having a surface in contact with the inner surface of each of the electrodes of the associated pair of electrodes in the region of the normal level of the salt bath, block means fitting between and block means fitting on both sides of each pair of electrodes and resting against the pot wall and against the face tile, said block means including surfaces in contact with the sides of each electrode in the region of the normal level of the salt bath, the face tile and block means being readily removable without disturbing the pot wall to facilitate removal and replacement of the electrodes.

4. A construction according to claim 3 in which each electrode comprises a unitary solid metal bar of rectangular and uniform cross section which bar extends in a straight run from a working region well below the normal level of the salt bath upwardly and out of the salt bath and to a level above the top edge of the pot wall, and a plurality of cold leg laminations secured in parallel, side-by-side, spaced relation to the rear face of the bar adjacent but spaced from the upper end thereof so that a guard portion of the bar projects above the upper side of the cold leg laminations, each electrode having interior coolant passage means in communication with projecting inlet and outlet fitting means arranged with respect to said guard portion of the bar so as to minimize the risk of accidental dislocation of the fitting means.

References Cited in the file of this patent
UNITED STATES PATENTS

| | | |
|---|---|---|
| 1,637,795 | Andrews | Aug. 2, 1927 |
| 2,223,139 | Upton | Nov. 26, 1940 |
| 2,234,476 | Jessop | Mar. 11, 1941 |
| 2,355,761 | Upton | Aug. 15, 1944 |
| 2,487,770 | Lepsoe | Nov. 8, 1949 |
| 2,508,004 | Adam | May 16, 1950 |
| 2,826,623 | Rosseau | Mar. 11, 1958 |

FOREIGN PATENTS

| | | |
|---|---|---|
| 892,954 | Germany | Oct. 12, 1953 |
| 929,935 | Germany | July 7, 1955 |